United States Patent [19]
Davis

[11] Patent Number: 5,482,482
[45] Date of Patent: Jan. 9, 1996

[54] AIR ENCIRCLING MARINE PROPELLER APPARATUS

[76] Inventor: Grover W. Davis, 3024 Kings Harbor Rd., Panama City, Fla. 32405

[21] Appl. No.: 262,884

[22] Filed: Jun. 21, 1994

[51] Int. Cl.⁶ .................................................. B63H 1/16
[52] U.S. Cl. ........................................ 440/67; 416/90 A
[58] Field of Search ......................... 114/67 A; 440/66, 440/67; 416/90 A, 93 A, 189 R, 189 B

[56] References Cited

U.S. PATENT DOCUMENTS 4,304,558  12/1981  Holtermann ............................. 440/67

OTHER PUBLICATIONS

Sales Brochure, Pump Jet Technology For Outboard Motors, ACT, Inc., Marine Propulsion Division.

Primary Examiner—Jesus D. Sotelo
Attorney, Agent, or Firm—Burns, Doane, Swecker & Mathis

[57] ABSTRACT

An air encircled marine thruster cowling includes a cowling that surrounds a propeller and provides an annular blanket of air around the slipstream from the propeller. The cowling includes an inner conical section around the propeller and an outer tubular section around the conical section to form an annular space around the conical section. A duct leads exhaust gas from the engine into the annular space, and an additional duct leads moving ambient air into the annular space, as when a boat is in motion.

14 Claims, 4 Drawing Sheets

AIR ENCIRCLING MARINE PROPELLER APPARATUS

FIELD OF THE INVENTION

The present invention relates to an apparatus for improving the thrust produced by a marine propeller.

BACKGROUND AND SUMMARY OF THE INVENTION

Marine propulsion systems generally operate to move a vessel through the water by producing an accelerated column of water. The column of water, known as the slipstream, provides a thrust against the propeller, nozzle or other propulsive device to push the vessel through the water.

The present invention, generally, provides an apparatus for increasing the thrust of a marine propulsion system without increasing the load on the engine.

More particularly, the present invention provides an apparatus for increasing the thrust of a conventional marine propulsion system by providing a blanket or layer of air encircling a slipstream produced by a propulsion system. According to a preferred embodiment, the invention comprises a cowling for a conventional marine propeller that radially encloses the propeller and extends downstream of the propeller to encircle the slipstream of the propeller. An inner part of the cowling is shaped as a section of a cone, with the propeller disposed in a front end of the cone section, and the cone section axially converging (or narrowing) in the rearward direction. An outer part of the cowling is tubular shaped and is longer than the inner part. A front end of the outer part is joined with a front end of the inner part so that the inner and outer parts form a rearward opening annular chamber. Means for providing air to the annular chamber is included to form a blanket of air around the propeller slipstream.

The means for providing air comprises at least a conduit leading engine exhaust to the annular chamber. Additional means includes a duct to lead ambient air to the annular chamber. Movement of the slipstream causes a vacuum in the annular chamber that draws air through the ambient air duct. Other suitable means may also be provided.

The invention is described in terms of a conventional propeller, however, it is understood that any apparatus which produces an accelerated column of water to move a vessel could be substituted with advantageous results in the invention, for example, a bow or stern thruster on the side of a vessel used for positioning the vessel for docking.

BRIEF DESCRIPTION OF THE DRAWING FIGURES

The present invention can be further understood with reference to the following description in conjunction with the appended drawings, wherein like elements are provided with the same reference numerals. In the drawings.

Figure 3:
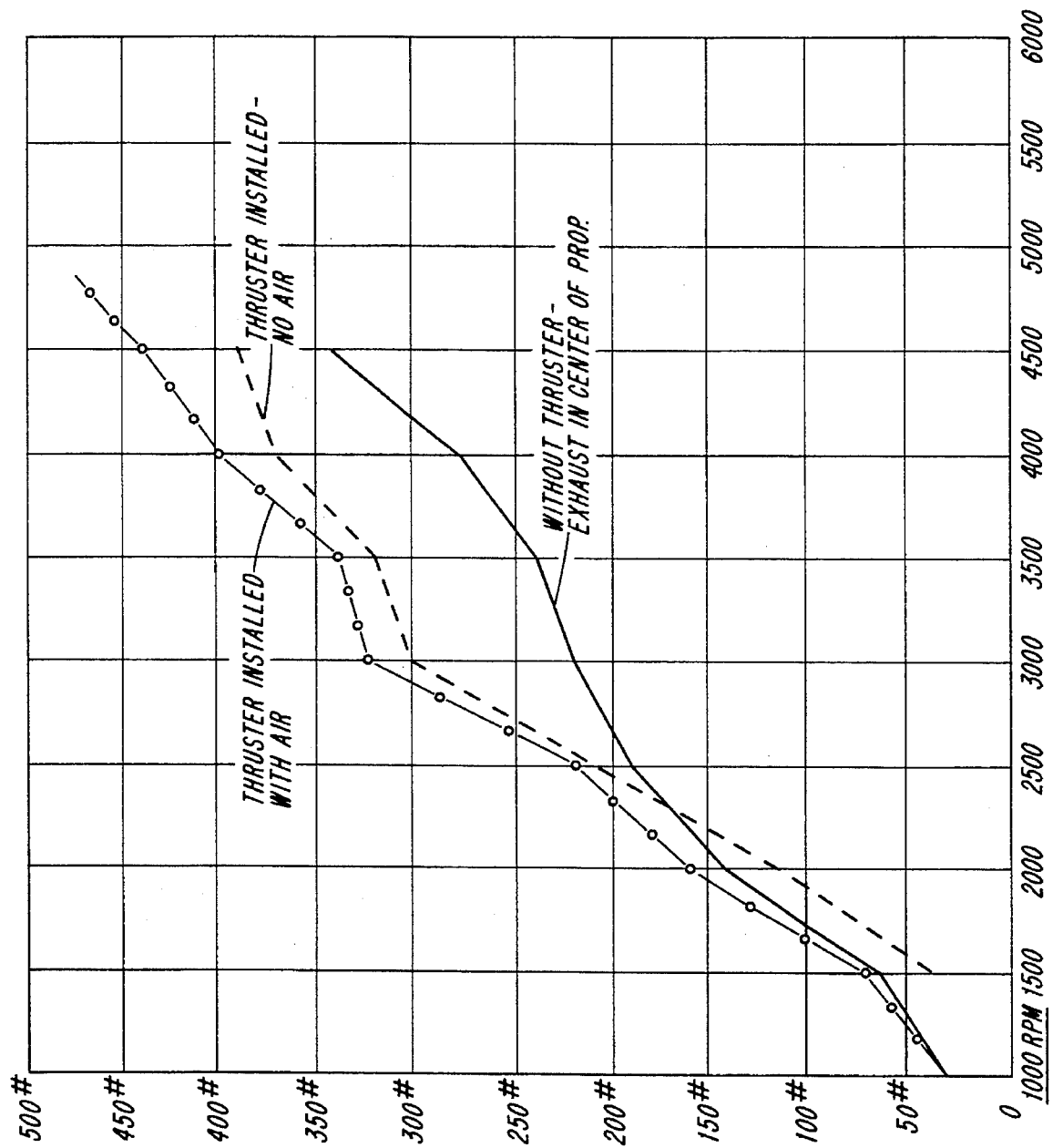
Figure 4:
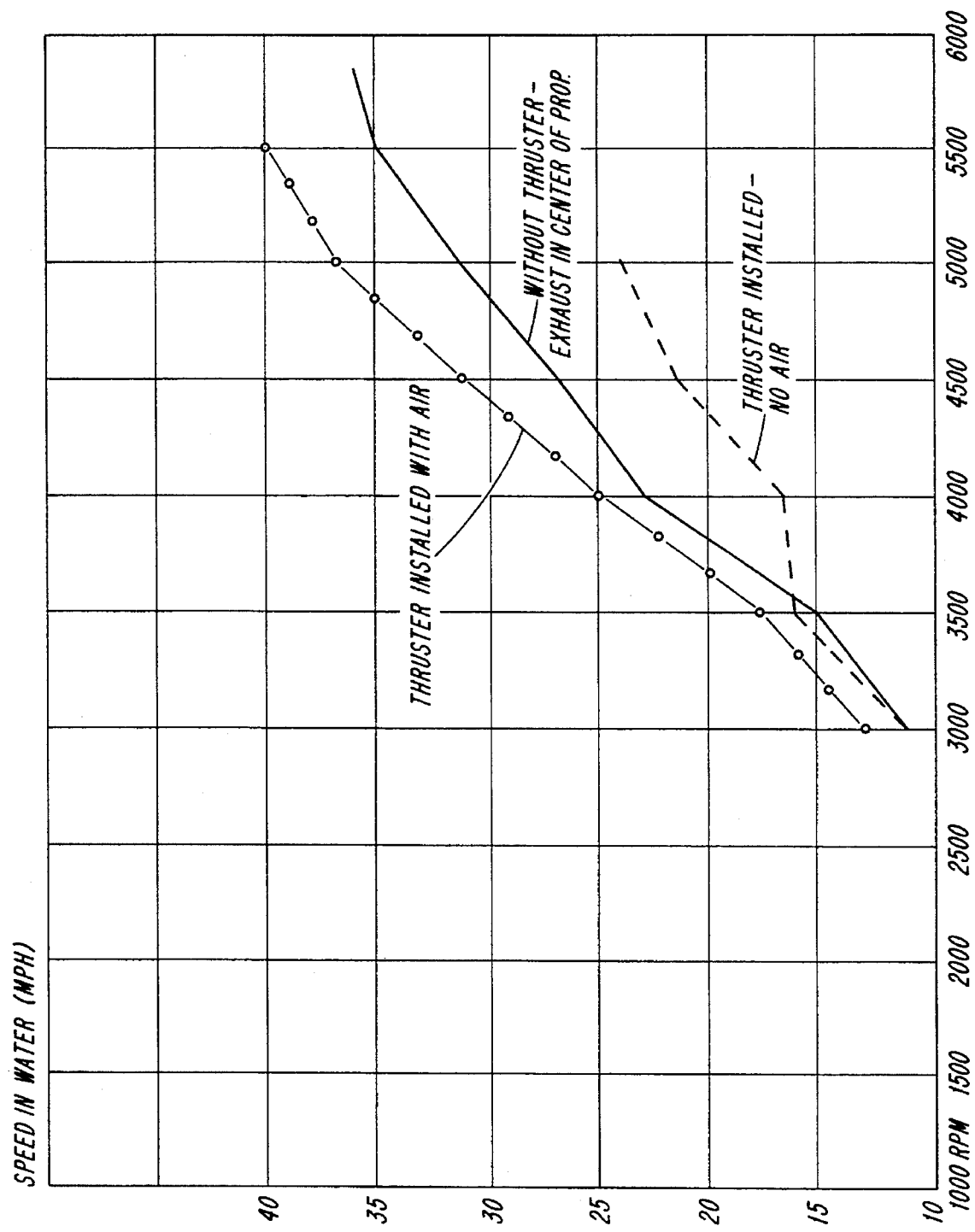

FIG. 3 is a graph of static thrust tests comparing a thrust produced by an engine having a conventional propeller and the same propeller equipped with an air-encircling thruster cowling according to the present invention; and, FIG. 4 is a graph of dynamic thrust tests comparing the speed of a boat with an outboard motor having with a conventional propeller and the same propeller equipped with the air-encircling cowling.

DETAILED DESCRIPTION OF PREFERRED EMBODIMENTS

Figure 1:
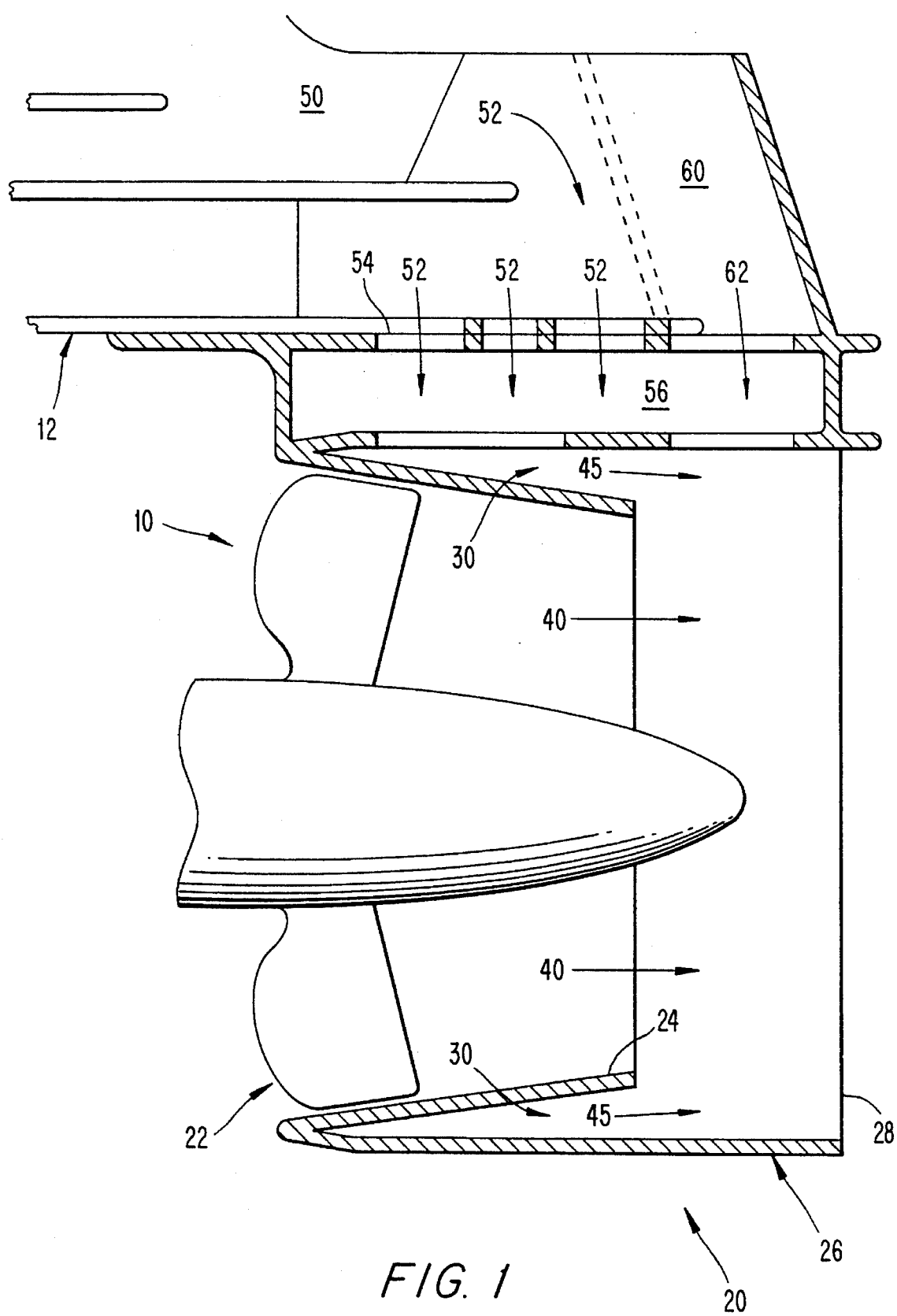
FIG. 1 is a sectional view of an air-encircling thruster cowling according to the present invention.
Figure 2:
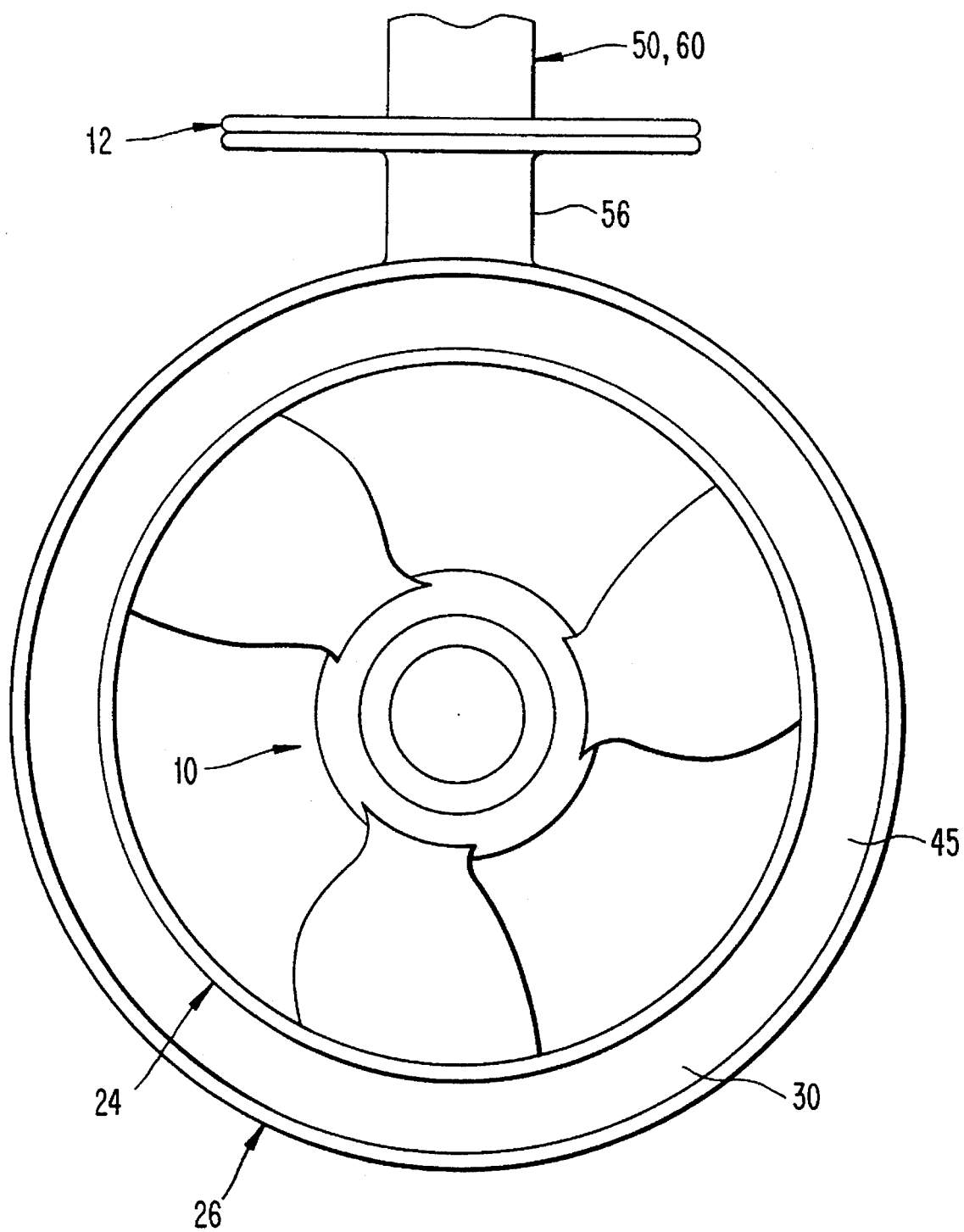
FIG. 2 is a rear view of the thruster cowling of FIG. 1.

FIG. 1 is a sectional view of an air encircling marine propeller apparatus, or thruster cowling, according to the present invention. A propeller cowling 20 is shown installed on a conventional outboard motor. FIG. 2 is rear view of the propeller 10 and cowling 20 of the present invention. Only as much of the outboard motor apparatus as is necessary to describe the invention is illustrated. The direction of flow of water and air are indicated by arrows.

Although the invention is described in conjunction with an outboard motor having a propeller, it is understood that the invention may be used with an inboard motor, or any other propulsion device that produces a column of water to provide thrust to move a vessel in the water.

The outboard motor includes a propeller 10 supported in a manner as is known. The propeller gearbox and rudder are not illustrated. The cowling 20 is a generally cylindrical body having an inlet end 22 and an outlet end 28. The cowling 20 is mounted to a suitable support structure 12 of the outboard motor adjacent to the propeller 10, so that the propeller is positioned in the cowling 20 adjacent to the inlet end 22.

The cowling 20 comprises two coaxially arranged, hollow elements, an inner body 24 and an outer body 26. The inner body 24 surrounds the propeller 10 and has a predetermined length extending downstream of the propeller. The inner body 24 is formed as a section of a cone, or frustoconical, shape that narrows in the downstream direction. A slipstream produced by the propeller, indicated by arrows 40, moves downstream of the propeller within the inner body 24.

The outer body 26 is formed with a cylindrical shape, and the inner body 24 is disposed within the outer body. The outer body 26 is longer than the inner body 24 extending in the downstream direction a predetermined distance farther than the downstream length of the inner body.

The inner 24 and outer 26 bodies are joined at a common front end 28 to form an annular space 30 the encircles the inner body 24. Means for providing air in the annular space 30 is arranged so that a blanket or layer of air, indicated by arrows 45, flows from the annular space 30 and encircles the slipstream 40 of the propeller 10.

Means for providing air in the annular space 30 includes a conduit 50 that carries exhaust from the outboard motor engine (not illustrated) to the annular space 30. The exhaust, indicated by arrows 52, passes from the conduit 50 to a chamber 56 through a series of openings 54. The chamber 56 communicates with the cowling 20, and the exhaust air 52 then travels to the annular chamber 30. An additional duct 60 is provided to lead ambient air into the chamber 56. Movement of the slipstream past the annular space 30 results in low pressure in the annular space, and consequently, the chamber 56. Air drawn by the duct 60 passes through the chamber 56 to the annular space 30, as indicated by the arrows 62.

The annular stream of air 45 surrounds the slipstream 40 of the propeller 10 as the slipstream exits the inner body 24 of the cowling 20. The encircling air is believed to facilitate the movement of the slipstream 40 into the surrounding water, increasing the thrust generated by the slipstream.

A series of tests has indicated that the present invention can significantly increase the thrust produced by a conventional outboard motor propeller at the same engine speed. The tests were performed for both static thrust and speed through the water for a 15 foot bass boat equipped with a 70 horsepower outboard motor.

In the static thrust test, the boat was attached to a set of hydraulic scales mounted on a fixed support to measure the thrust produced by the propeller. The engine was run through a range of speeds and the resulting thrust recorded. The test was repeated with the propeller equipped with a cowling according to the present invention. The tests were again repeated with the air injection means blocked to test the effect of the cowling alone.

The results of the tests are shown in FIG. 3. As can be seen, the propeller with a thruster cowling produced thrust significantly higher than a conventional propeller throughout the range of speeds tested, and was greatest in the upper engine speed region. The use of a cowling without an annular air stream around the slipstream increased thrust, but as can be seen, the increase was less than for the cowling with air injection according to the present invention.

For the dynamic tests, the speed of the boat at various engine speeds was measured. The engine was taken through a range of engine speeds and the speed of the boat in the water was measured. The tests were conducted with the conventional propeller and with the propeller equipped with the thruster cowling both with and without an air stream. The results of the dynamic test are shown in FIG. 4. As can be seen, the thruster cowling-equipped propeller produced greater boat speeds throughout the range of engine speeds.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. An apparatus for increasing thrust in marine propulsion, comprising:
   a first hollow body with an inlet and an outlet, the body radially converging toward the outlet to form a conical space for a stream of water, the body being positioned to guide a stream of water from the inlet to the outlet;
   a second hollow body having a cylindrical shape, disposed to surround the first body to form an annular space around first body; and,
   means for introducing air into the annular space to surround the stream of water at least at the outlet of the first body with an annular blanket of air.

2. The apparatus as claimed in claim 1, wherein the means for introducing air into the annular space comprises a conduit to direct air from an engine exhaust into the second body.

3. The apparatus as claimed in claim 1, further comprising a duct to lead ambient air to the annular space.

4. The apparatus as claimed in claim 1, further comprising means for directing a propulsive stream of water through the second body.

5. An apparatus for improving thrust for marine vessel propulsion, comprising:
   a first hollow body having a substantially cylindrical shape and a first end and a second end;
   a second hollow body disposed within the first hollow body, the second body having a frustoconical shape open at a front end and at a rear end and converging toward the rear end, the second body defining therewithin a space for a propulsive stream of water;
   the first end of the first body and the front end of the second body being joined to define a rearward opening annular chamber surrounding the second body; and
   means for providing air in the annular chamber.

6. The apparatus as claimed in claim 5, wherein the second body has a predetermined length that is less than a predetermined length of the first body.

7. The apparatus as claimed in claim 5, wherein the means for providing air into the annular chamber comprises a conduit connectable to an engine exhaust.

8. The apparatus as claimed in claim 5, wherein the means for providing air into the annular chamber comprises a duct to lead ambient air into the annular chamber.

9. The apparatus as claimed in claim 5, further comprising a propeller disposed for rotation in a front portion of the second body to produce a column of water that moves through the second body.

10. The apparatus as claimed in claim 5, further comprising means for directing a propulsive stream of water through the second body.

11. An air encircled marine propeller apparatus comprising:
   a propeller having an axial direction and a radial direction;
   a cowling radially surrounding the propeller and extending axially a predetermined distance rearward from the propeller, the cowling having a frustoconically shaped radially inner part and a cylindrically shaped radially outer part forming therebetween an annular space closed at a forward end and radially widening toward a rearward end, the propeller being disposed at an entry end of the inner part;
   means for providing air in the annular space.

12. The apparatus as claimed in claim 11, wherein the outer part extends rearward beyond a rearward end of the inner part.

13. The apparatus as claimed in claim 11, wherein the means for providing air in the annular space includes a conduit connected to an exhaust of an engine.

14. The apparatus as claimed in claim 11, wherein the means for providing air into the annular space includes a duct to lead ambient air to the annular space.

\* \* \* \* \*

UNITED STATES PATENT AND TRADEMARK OFFICE
Certificate

Patent No. 5,482,482                              Patented: January 9, 1996

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Grover William Davis, Panama City, Fla. and Edsel G. Davis, Panama City, Florida.

Signed and Sealed this Twenty-fourth Day of March, 1998.

DAVID M. MITCHELL
*Supervisory Patent Examiner*
Patent Examining Art Unit 3612